United States Patent
D'Alterio et al.

(10) Patent No.: US 8,495,185 B2
(45) Date of Patent: *Jul. 23, 2013

(54) MINIMIZING NETWORK RESOURCE OVERHEAD CONSUMPTION BY REPORTS FROM ONE OR MORE AGENTS DISTRIBUTED IN AN ELECTRONIC DATA NETWORK OF NODES

(71) Applicant: International Business Machines Corporation, Armonk, NY (US)

(72) Inventors: Domenico D'Alterio, Rome (IT); Gianluca Mariani, Rome (IT); Bruno Portaluri, Rome (IT); Riccardo Rossi, Rome (IT); Antonio Secomandi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,010

(22) Filed: Oct. 24, 2012

(65) Prior Publication Data
US 2013/0054799 A1 Feb. 28, 2013

Related U.S. Application Data

(63) Continuation of application No. 13/183,031, filed on Jul. 14, 2011.

(30) Foreign Application Priority Data

Aug. 6, 2010 (EP) .................................... 10172103

(51) Int. Cl.
*G06F 13/00* (2006.01)

(52) U.S. Cl.
USPC ............................ 709/221; 709/224; 709/238

(58) Field of Classification Search
USPC .................. 709/220, 221, 223, 224, 238, 252
See application file for complete search history.

(56) References Cited

U.S. PATENT DOCUMENTS

| | | | |
|---|---|---|---|
| 5,428,645 A | 6/1995 | Dolev et al. | |
| 5,812,793 A | 9/1998 | Shakib et al. | |

(Continued)

FOREIGN PATENT DOCUMENTS

EP 2086204 A2 8/2009

OTHER PUBLICATIONS

U.S. Appl. No. 13/183,031.

(Continued)

*Primary Examiner* — Viet Vu
(74) *Attorney, Agent, or Firm* — Francis Lammes; Stephen J. Walder, Jr.; Yeen C. Tham

(57) ABSTRACT

A mechanism is provided for minimizing network resource overhead consumption by reports from one or more agents distributed in an electronic data network of nodes having a hierarchical reporting structure. Reports are received from other nodes in an electronic network of nodes or one or more agents further from a network root node in the electronic network of nodes. The reports are submitted to another node closer to the network root node in response to another node existing between the node and the network root node. The reports are submitted to the network root node in response to no other node existing between the node and the network root node. The node is adapted to only report variations in the expected report flow associated with the received reports.

8 Claims, 6 Drawing Sheets

U.S. PATENT DOCUMENTS

| | | | |
|---|---|---|---|
| 5,884,324 | A | 3/1999 | Cheng et al. |
| 6,157,957 | A | 12/2000 | Berthaud |
| 6,199,169 | B1 | 3/2001 | Voth |
| 6,754,664 | B1 | 6/2004 | Bush |
| 7,028,122 | B2 * | 4/2006 | Williams ............ 710/260 |
| 7,174,387 | B1 * | 2/2007 | Shand et al. ............ 709/238 |
| 7,349,980 | B1 * | 3/2008 | Darugar et al. ............ 709/238 |
| 7,680,060 | B2 | 3/2010 | Jennings |
| 7,693,873 | B2 | 4/2010 | Nesbitt et al. |
| 2009/0228509 | A1 | 9/2009 | McCarthy et al. |

OTHER PUBLICATIONS

Office Action mailed Dec. 31, 2012 for U.S. Appl. No. 13/183,031, 10 pages.

* cited by examiner

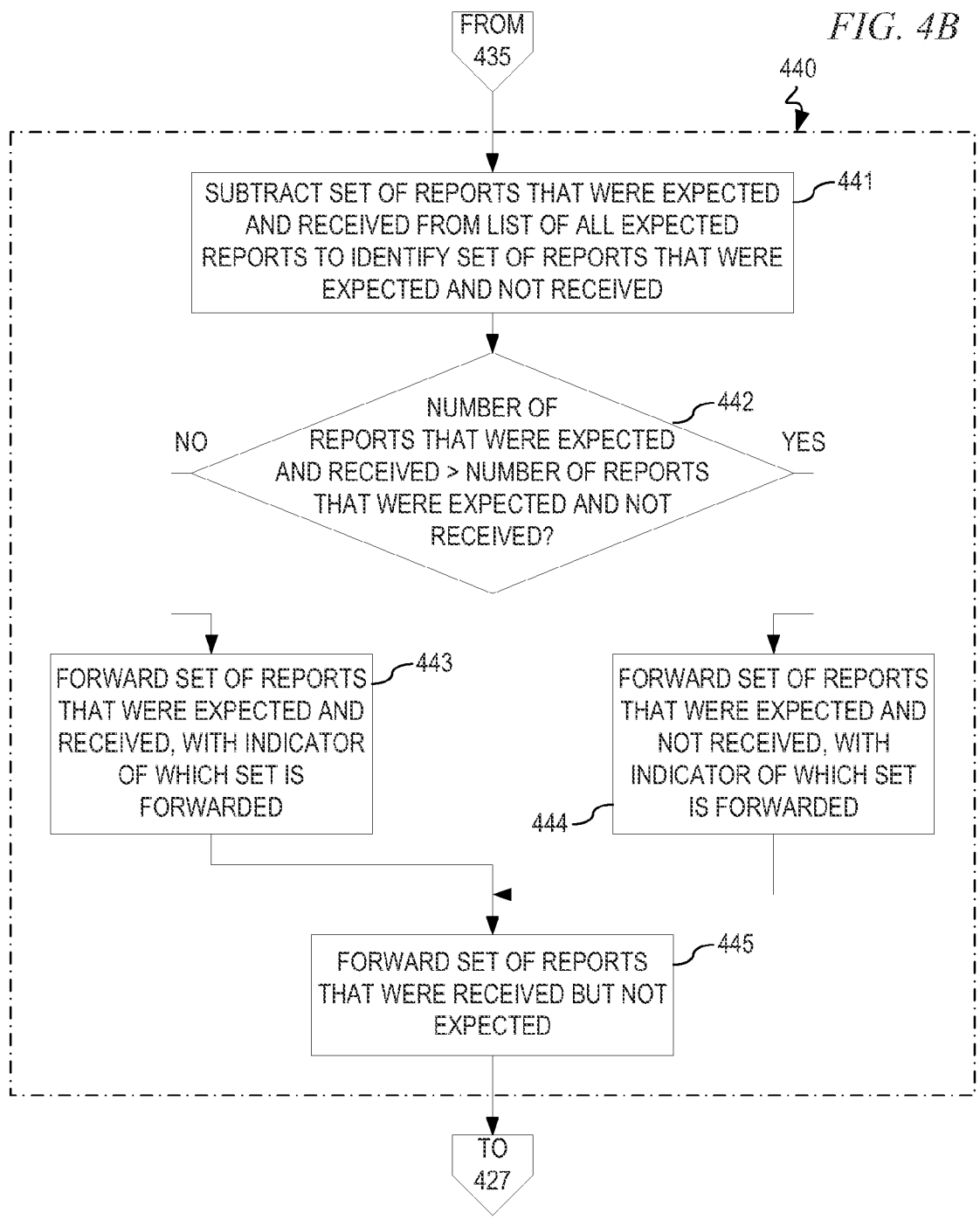

MINIMIZING NETWORK RESOURCE OVERHEAD CONSUMPTION BY REPORTS FROM ONE OR MORE AGENTS DISTRIBUTED IN AN ELECTRONIC DATA NETWORK OF NODES

BACKGROUND

The present invention relates to electronic data networks and more particularly to minimising network resource overhead.

Electronic data networks are often thought of in terms of interconnected nodes, amongst which data may be exchanged. In current art, a local time maintained at a node within a network architecture is synchronized with a reference time. Bursts of synchronization messages containing reference time stamps are transmitted over a network or communication link according to a predetermined protocol. Also in current art, an agent for replicating data stored in source database tables in a database management system is implemented by a server at a remote client implemented on a client computer based on a client defined replication period. Further, in other art mechanism are provided for asynchronous store and forward data replication. Such mechanisms utilize one-way, unacknowledged communication messages between systems in a computer network to transfer locally modified data to other systems having a copy of the data. FIG. 1 shows an agent reporting system as known in the prior art. As shown in FIG. 1, n Agents A3 (131) to A3n (132) are distributed amongst a number of clients. These agents monitor activity on these clients and regularly report to a root node 105.

SUMMARY

In one Illustrative embodiment, a method, in a data processing system, is provided for minimising network resource overhead consumption by reports from one or more agents distributed in an electronic data network of nodes having a hierarchical reporting structure. The illustrative embodiment receives, by a node in the electronic network of nodes, reports from other nodes in the electronic network of nodes or the one or more agents further from a network root node in the electronic network of nodes. Responsive to another node existing between the node and the network root node, the illustrative embodiment submits the reports to another node closer to the network root node. Responsive to no other node existing between the node and the network root node, the illustrative embodiment submits the reports to the network root node. In the illustrative embodiment, the node is adapted to only report variations in the expected report flow associated with the received reports.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

Further advantages of the present invention will become clear to the skilled person upon examination of the drawings and detailed description. It is intended that any additional advantages be incorporated herein.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIGS. 4A and 4B are flowchart representing the steps of a method according to an embodiment;

DETAILED DESCRIPTION

It is desired to efficiently manage reports, such as health reports, from many thousands or even millions of agents.

Figure 2:
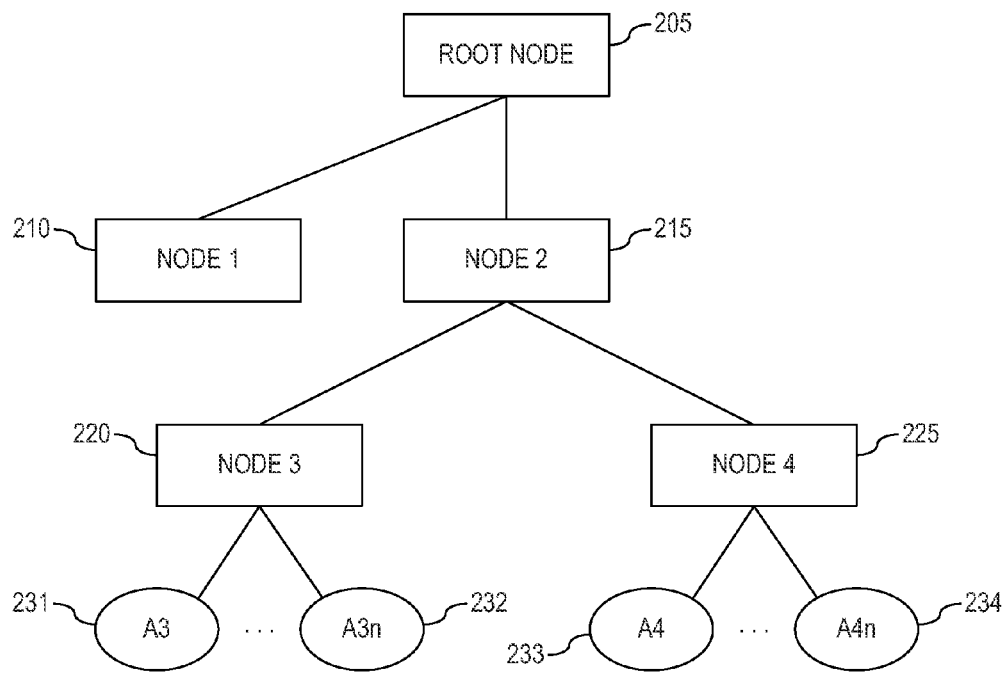
FIG. 2 shows a future configuration in which software applications require the distribution of large number of agents through a hierarchy of nodes arranged in a tree structure.

FIG. 2 shows a future configuration in which software applications require the distribution of a large number of agents through a hierarchy of nodes arranged in a tree structure.

Figure 1:
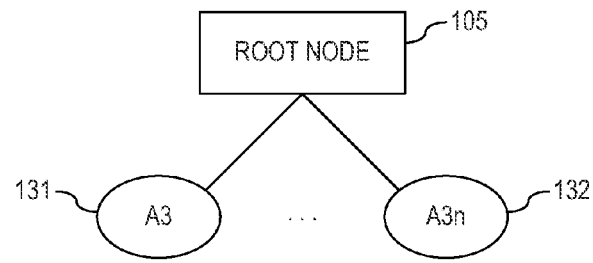
FIG. 1 shows a agent reporting system as known in the prior art.

This is may be made possible by an enhancement of the distribution infrastructure shown in FIG. 1. The single node distribution infrastructure architecture of FIG. 1 is replaced by multi-layer hierarchical distribution infrastructure as shown in FIG. 2.

In particular, there is shown an exemplary hierarchy comprising a root node 205, which is in communication with two first tier nodes 210 and 215. The first tier node 215 is in turn in communication with two leaf nodes 220 and 225. The leaf node 220 is in turn in communication with n agents, with two such agents 231 and 232 being shown. Similarly, the second leaf node 225 is in communication with n agents, with two such agents 233 and 234 being shown. Where agents are thus distributed, it will generally be desired to centrally monitor their status, e.g. at the root node 205. Such information is stored on the leaf Endpoint Controller, that is, at the leaf node to which a respective agent is connected. As the complexity of the hierarchy increases, in particular in terms of the number of leaf nodes associated with an agent, a problem arises in efficiently propagating this information towards the root node 205 given the large number of managed agents.

In the architecture shown, data moves bottom up (upstream) for the information that the agent sends to the server and top down (downstream) for the information that the server sends to the agents. Accordingly there are provided one or more agents distributed in an electronic data network of nodes having a hierarchical reporting structure, whereby each node receives reports from downstream nodes and submits these to upstream nodes.

It is proposed that in order to minimise network resource overhead consumption by the flow of reports in such an arrangement, at least one said node should be adapted to only report upstream in the case where variations in the expected report flow. According to one embodiment, only unexpected reports are passed upstream.

Table 1 below shows the data that may be gathered at leaf node 225 by way of example. In particular, as shown in table 1 the leaf node 225 gathers an identifier for each of the n agents 233 and 234 associated thereto. With each node identifier is associated the IP address of that node, and the Last Service Time value for that node, as well as any other information specific to a node that it may be expedient to so gather.

TABLE 1

| ID | IP | Last_Service_Time | Others |
|---|---|---|---|
| A4 | IPA1 | T1 | xyz |
| A4n | IPA2 | T2 | xyz |

It is proposed that the agent information gathered at the leaf nodes should be passed up successively to the next highest node in the hierarchy. Accordingly, Table 2 shows the data that may be gathered at first tier node 215 by way of example. In particular, as shown in Table 2 the first tier node 215 incorporates not only the content of Table 1, but also incorporates equivalent information for the agents 231 and 232 attached to leaf node 220, which shares first tier node 215 with leaf node 225 as its immediate hierarchical superior.

TABLE 2

| ID | IP | Last_Service_Time | Others |
|---|---|---|---|
| A3 | IPA1 | T1 | xyz |
| A3n | IPA2 | T2 | xyz |
| A4 | IPA1 | T3 | xyz |
| A4n | IPA2 | T4 | xyz |

In accordance with this same principle, Table 3 shows the data that may be gathered at root node 205 by way of example. In particular, as shown in Table 3 the root node 205 incorporates not only the content of Table 2, but also incorporates equivalent information as provided by first tier node 210 which shares root node 205 with first tier node 215 as its immediate hierarchical superior. In a similar manner to that described above, first tier node 210 will have received information gathered by its child nodes, so that Table 3 as compiled at the root node 205 will contain complete details for every agent in the hierarchy.

While the hierarchy has been described as having one intermediate tier between the root and leaf nodes, it will be appreciated that the approach described herein is extendable to a hierarchy having any number of tiers. Neither is it necessary that each branch of the hierarchy have the same number of dependent tiers.

TABLE 3

| ID | IP | Last_Service_Time | Others |
|---|---|---|---|
| A3 | IPA1 | T1 | xyz |
| A3n | IPA2 | T2 | xyz |
| A4 | IPA1 | T3 | xyz |
| A4n | IPA2 | T4 | xyz |
| ... | ... | ... | ... |
| ... | ... | ... | ... |
| ... | ... | ... | ... |

It will be appreciated that as this approach is scaled, the amount of data that moves in both directions will become considerable and in order to keep the system working data is sent from node to node on a predefined time interval in a batch like mode. On a large distribution based on agent availability it may take days before message sent from the server reaches the agent and gets back home.

This architecture is able to efficiently move a considerable amount of data but it struggles in addressing the need to properly represent at the server site the state of the agent.

It is proposed that state information is be stored on the leaf node to which the agent is connected by mean of the Last Service Time information that is recorded in the node database tables.

Given the large number of agents involved, it is problematic to provide an efficient upstream propagation of the Last Service Time information.

Also, the state information, in order to be reliable must travel upstream using a different mechanism than the one used for standard messages in order to provide a more reliable system.

The proposed solution provides an efficient way to propagate upstream the state of the agents without compromising the overall system performance.

The prior art discussed above shows methods and systems to synchronize data in an efficient way or to synchronize times between apparatus. The proposed invention addresses the problem of replicating time data/information in an efficient way leveraging an approximation algorithm that can improve the replication velocity performing inference on the time values, This allows having good quality data on the upstream database and to shorten the replication cycle making the information most current, which is essential for state information class.

The proposed solution is based on an approximate determination of agent based on a time interval computation and data exchange.

Each node periodically identifies the agents as a subset of all of the agents associated with that node that should under normal circumstances have reported their status within the intervening period. For each of the agents thus identified it is determined whether a status report was in fact receive, and those agents who should have reported their status within the intervening period, but did not, are determined to have a negative status, and those agents who should have reported their status within the intervening period, and did so, are determined to have a positive status. The period may be variable, in which case it may be set for all or a subset of nodes, or determined by each node or subset of nodes independently.

The above approach may be understood as determining a notional list of the agents that should have reported their status, and subdividing this list into a first list citing those agents who should have reported their status within the intervening period, but did not, as having a negative status, and a second list citing those agents who should have reported their status within the intervening period, and did so, as having a positive status.

One of these two sublists will be shorter than the other. The shorter of the two sublists, which might relate either to positive or negative status, is provided to the parent node. In cases where the period is variable, it may be desirable for the node to submit details of the time interval used to make the determination, with each submission, or whenever the period is changed.

In a case where one of the lists is empty, no list is submitted, but merely an indication that all agents have positive or negative.

It may occur that a status report is received from an agent that was not on the list of agents due to make a report. Preferably such positive exceptions are also reported to the parent node for those agents that had an unexpected update.

The parent node is able to compute the same group of agents that should have a positive or negative status for the given time interval and therefore make the necessary database updates.

Figure 3:
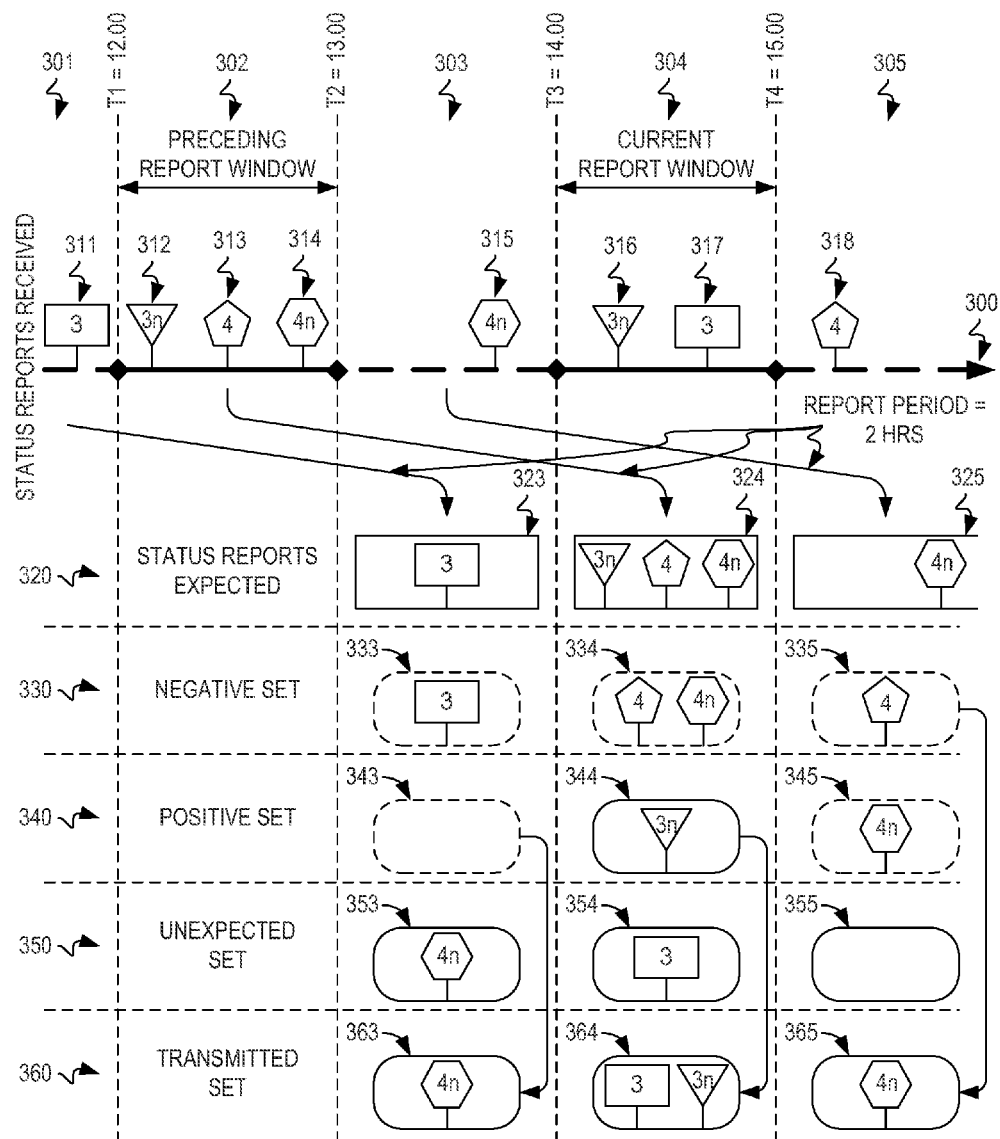
FIG. 3 shows an embodiment of the present invention from the point of view of an intermediate node.

FIG. 3 shows an embodiment of the present invention from the point of view of an intermediate node. In particular, the example of FIG. 3 describes an embodiment from the point of view of the first tier node 215 described above. As shown, a series of status reports 311 to 318 are received at the first tier node 215 at different points in time as indicated by their position along the axis 300. The axis 300 is divided into one hour sections 301 to 305, with section 301 corresponding to the period from 11:00 to 12:00, 302 corresponding to the period from 12:00 to 13:00, 303 corresponding to the period from 13:00 to 14:00, 304 corresponding to the period from 14:00 to 15:00, and 305 corresponding to the period from 16:00 to 16:00. In the column of each of the hour sections 301 to 305 there are shown a series of rows 320, 330, 340, 350, and 360. Row 320 contains cells 323, 324, and 325 which each contain the list of agents from which status reports are expected during the corresponding time window. Row 330 contains cells 333, 334, and 335 which each contain the list of agents from which status reports were expected and duly received for each corresponding time window. Row 340 contains cells 343, 344, and 345 which contain the lists of agents from which status reports were expected but not received between for each respective time window. Row 350 contains cells 353, 354, and 355 which contain the lists of agents from which reports were received unexpectedly during a respective time window, that is, reports received from agents that are not listed in the corresponding cell in row 320. Row 360 contains cells 363, 364, and 365 which contain the lists of agents forwarded to the next node at the end of the analysis.

In this example we have a list of four agents 3, 3n, 4, and 4n, which are known to report to the node under consideration. Reports arriving from agent 3 are represented in FIG. 3 by a rectangular marker, reports arriving from agent 3n are represented in FIG. 3 by a triangular marker, reports arriving from agent 4 are represented in FIG. 3 by a pentangular marker, and reports arriving from agent 4n are represented in FIG. 3 by a hexagonal marker. The report windows 301, 302, 303, 304 and 305 are all one hour long, each having a known beginning and end time.

Taking 304 to be the current report window, it is determined for each of the agents 3, 3n, 4, and 4n whether a report was received from that respective agent in a respective preceding window.

To make this possible, from an actual implementation prospective a new column to the TARGET table is added to store the value that the Last Service Time column had when the record was computed. This column is named PREVIOUS_LAST_SERVICE_TIME (PLST).

Table 4 below shows a table corresponding to Table 2 above, populated with PLST values.

TABLE 4

| ID | IP | Last_Service_Time | Previous_Last_Service_Time | Others |
|----|------|-------------------|----------------------------|--------|
| A3 | IPA1 | | 11:45 | xyz |
| A3n | IPA1 | | 12:15 | xyz |
| A4 | IPA2 | | 12:30 | xyz |
| A4n | IPA2 | | 12:50 | xyz |

In the present example, the preceding window corresponding to window 304 is the window 302, that is, a window whose beginning time is before the beginning time of said current window minus the report period of the respective agent (two hours for all agents in the present example), and whose end time is before the end time of said current window minus the report period of the respective agent. In other words, in the present example, the preceding window for any current window will be the window two hours earlier.

Taking the "PLST" values listed in Table 4 above, the time at which the next report is expected can be determined as shown In Table 5 below.

TABLE 5

| ID | Previous_Last_Service_Time | Expected Service Time |
|----|----------------------------|----------------------|
| A3 | 11:45 | 13:45 |
| A3n | 12:15 | 14:15 |
| A4 | 12:30 | 14:30 |
| A4n | 12:50 | 14:50 |

Where a report was received for a given agent in the preceding window, a further report from that agent is considered to be due in the current report window.

On this basis, it can be seen that in the hour between 14:00 and 15:00, the node 215 would expect to receive status reports from agents 4n, 4, and 3n, as represented in cell 324.

In this model representation the agent has a scheduled service time of 2 Hrs, meaning that each agent will contact the node every 2 Hrs for messages and status update. During this communication the Last Service Time is updated.

The Analysis Interval is set to 1 Hr, meaning that every 1 Hr the analysis and computation is performed to determine the agents that should have contacted the node in the Analysis Interval period.

The first tier node 215 awaits reports from agents for the duration of the current report window, and when a report is actually received, the Last Service Time is updated, as shown in Table 6 below.

TABLE 6

| ID | IP | Last_Service_Time | Previous_Last_Service_Time | Others |
|---|---|---|---|---|
| A4 | IPA1 | 14:40 | 11:45 | Xyz |
| A4n | IPA1 | 14:15 | 12:15 | Xyz |
| A3 | IPA2 | 15:15 | 12:30 | Xyz |
| A3n | IPA2 | 13:50 | 12:50 | Xyz |

Those agents are the one that have a Last Service Time that fall in the Analysis Interval that is Service Time back in time. In other words given a Service time of 2 Hrs, the agents expected to check in with the node in the time interval 14:00 to 15:00 are those that last checked in the 12:00 to 13:00 time Interval.

The computation results in a Positive Set (the agents that were expected and that in fact did show up), a Negative Set (the agents that were expected but for some reason did not show up), and an Unexpected Set (the agents that were not expected but did show up).

On the basis of the gathered information it can be determined whether each expected report was in fact received or not, as respected in cell 334, in which are gathered the reports that were expected, but not received are gathered (in this case, reports from agents 4 and 4n), and cell 344, in which are gathered the reports that were expected and duly received are gathered (in this case, a report from agent 3n). Furthermore, those reports that were received from agents from which no report was expected in the present window can be identified, as represented in cell 354 (in this case a report from agent 3).

First tier node 215 now forwards whichever is the smallest of the set of reports that were expected, but not received on one hand (those in cell 334) and the set of reports that were both expected and received (those in cell 344) on the other, to the next node upwards in the reporting hierarchy. This information is transmitted together with an indicator as to which of the two sets is forwarded (the set of reports that were expected but not received on one hand, or the set of reports that were both expected and received), and any reports that were received, but not expected.

The information transmitted on this basis for each time window is shown in row 360. In the present example, the set of reports that were expected but not received on one hand contains two agents and the set of reports that were both expected and received contains one agent, so the information transmitted for window 304 is the set of reports that were both expected and received (those in cell 344—agent 3n) and the reports that were not expected (those in cell 354—agent 3), so that the reports transmitted are those received from agent 3 and 3n, as shown in cell 364, along with an indication that the report from agent 3n was expected and received.

Figure 4A:
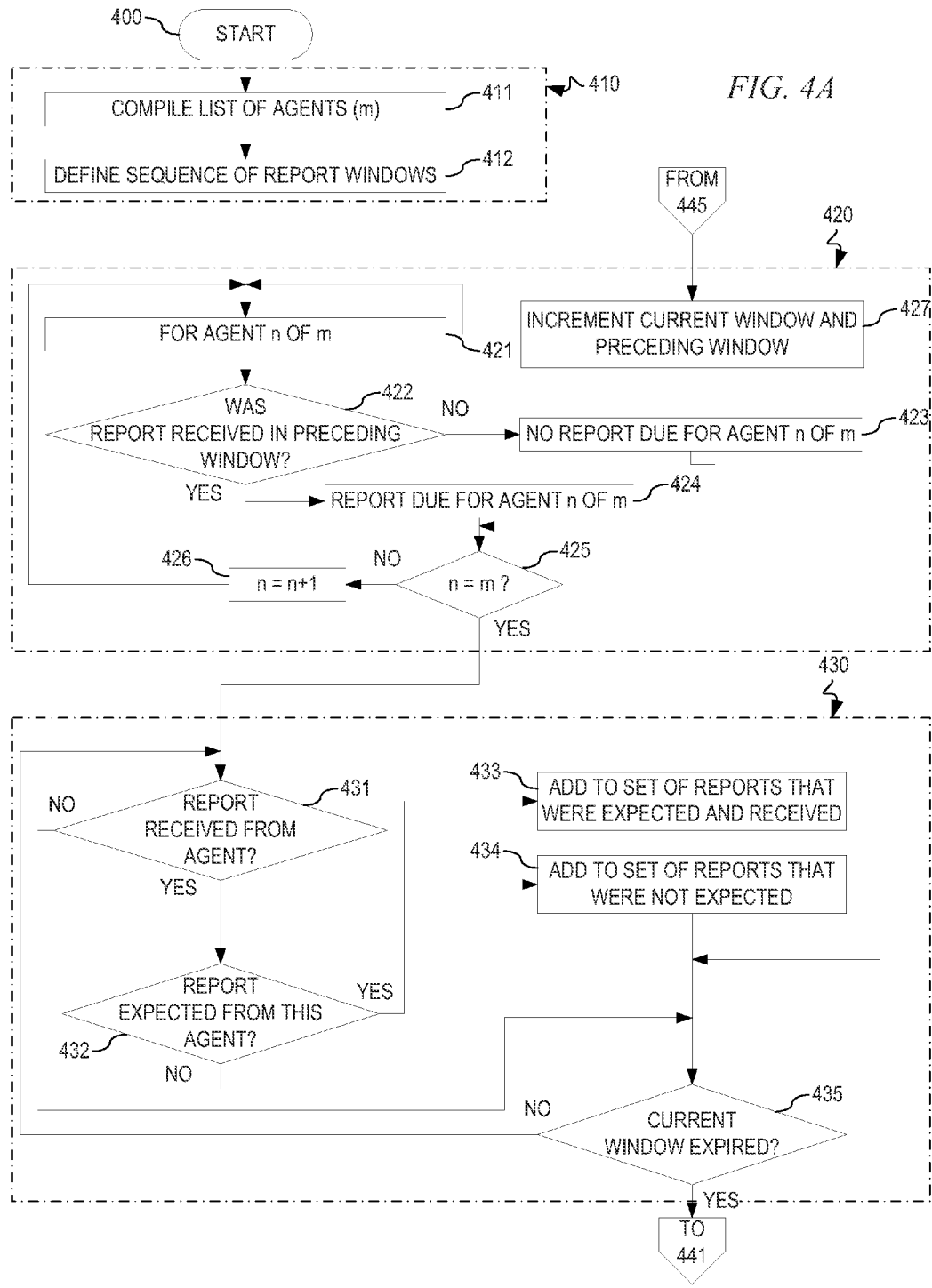

FIGS. 4A and 4B are a flowchart representing the steps of a method according to an embodiment.

As shown in FIGS. 4A and 4B, the method starts at step 400. The method of FIGS. 4A and 4B comprise four phases the first phase 410 is an initiation phase. The Initiation phase starts at step 411 at which a list of m agents is compiled. This list may be compiled automatically on the basis of the reports that are received at the node during a training period, and may be updated whenever a report is received from a previously unknown agent. The list may also be compiled by passing an enquiry message to inferior nodes requesting that all agents identify themselves. In a case where there is a plurality of nodes implementing the present invention, each node may be adapted to propagate information concerning the agents from which it receives reports upwards towards the root node. In other words, the report period of each agent may be determined to be the average interval between a predetermined number of previous reports from that respective agent. Furthermore, some or all agents may notify the node of their report period. Furthermore, the report period of some or all agents may be set from a control node, and this control node notifies said at least one node of the report period for each agent from which it is to receive reports.

The method then proceeds to a step 412 of defining a sequence of report windows. The windows are preferably of equal length. Preferably the windows should be sequential, with no overlap, and no gaps. The duration of the windows may be defined on the basis of the general level of activity of the reporting agents, since an optimal reduction in overall report traffic will be achieved if the window duration is chosen such that as many agents as possible may be expected to report once, without any single agent reporting more than once, in each window. In some cases it may be desirable to define the window duration as varying in a cyclic manner so as to correspond to periods of higher expected reporting activity. In some cases, the window may be dynamically determined on the basis of recent activity. In a case where there are a plurality of nodes implementing the present invention it may be desirable that they share the same window definitions, in which case each node may be adapted to propagate such information, for example from a root node to the leaf nodes.

The method now enters the second phase 420, in which the method determines whether a report is due from each agent in the current report window.

The method proceeds from step 412 to step 421, at which an agent n of m is identified, and then at step 422 it is determined whether this agent n of m was received in the preceding window. This preceding window need not be the immediately preceding window for example in the embodiment of FIG. 3 it was assumed that each agent would report every two hours, whilst the window duration was one hour, so that the window of reference, referred to here as the preceding window, is in fact separated from the current window by an interceding window. As described above, in a case where a report was not received for the agent n of m in the preceding window, the method proceeds to step 423, whereby no report is considered to be due for that agent. On the other hand, in a case where a report was received for the agent n of m in the preceding window, the method proceeds to step 424, whereby a report is considered to be due for that agent. In either case, the method next proceeds to step 425 at which it is determined whether n=m, i.e., the agent presently under consideration is the last agent on the list compiled at step 411. If it is not, the method proceeds to step 426 at which n is incremented to the next agent before returning to step 421. Otherwise, the method proceeds to the next phase.

The third phase, 430, relates to processing the reports received during the current window, on the basis of the determinations made for each agent in the second phase.

The method proceeds from step 425 to 431 at which it is determined whether a report has in fact been received. If no report has been received, the method proceeds to step 435 at which it is determined whether the present window has expired. If the present window has not expired, the method reverts to step 431, such that the method cycles between steps 431 and 435 until either a report is received, or the current window expires. If it is determined at step 431 that a report has been received, the method proceeds to step 432, at which it is determined whether the report was expected from the agent in question, on the basis of the determinations made in phase two. If it is determines that the report was expected, then it is added to the set of reports that were expected and received at step 433 (cell 344 in the example of FIG. 3). Otherwise the report is added to the set of reports that were received, but not expected (cell 354 in the example of FIG. 3). In either case, the method then returns to step 435, and resumes its cycle between steps 431 and 435 until either a further report is received, or the current window expires. When it is determined at step 435 that the current window expired, the method proceeds to the fourth phase.

The fourth phase, 440, relates to the selection and forwarding of information gathered in the third phase.

The method proceeds from step 435 to step 441, at which the set of reports that were expected and received is subtracted from the list of agents compiled at step 411, to obtain a list of reports that were expected, but not received, whereafter the method proceeds to step 442, at which it is determined whether the number of reports that were expected and received is greater than number of reports that were expected and not received. In a case where the number of reports that were expected and received is greater than number of reports that were expected and not received, the method proceeds to step 444 at which the set of reports that were expected and not received, are forwarded to the next node in the hierarchy, together with an indicator of which set is forwarded. In the case where the number of reports that were expected and received is not greater than number of reports that were expected and not received meanwhile, the method proceeds to step 443, at which the set of reports that were expected and received are forwarded to the next node in the hierarchy, with an indicator of which set is forwarded. In either case the method then proceeds to step 445 at the set of reports that were received but not expected is also forwarded to the next node in the hierarchy.

The method then loops back to step 427 at which the current window and the preceding window are incremented, for the next window.

It will be appreciated that a certain number of the steps described can be carried out in different orders without changing their effect. For example, steps 411 and 412 may be interchanged without effect, steps 445 and 443/444 may be by interchanged without effect.

It will be appreciated that die particular steps within each phase could be replaced with other steps that would achieve the same effect.

There is accordingly provided a method comprising the further steps of:
compiling a list of all agents,
defining a sequence of report windows, each having a known beginning and end time, Preferably each window has the same duration.
for a current said report window, determining for each of said agents whether a report was received from that respective agent in a respective preceding window, where said preceding window is a window whose beginning time is before the beginning time of said current window minus the report period of the respective said agent (preferably the report period of each agent has the same duration), and whose end time is before the end time of said current window minus die report period of the respective said agent, and where such a report was received for that agent in that respective preceding window, considering a further report from said respective agent to be due in the current report window,
awaiting reports from said agents for the duration of said current report window, and
forwarding one of either the set of reports that were expected, but not received on one hand and the set of reports that were both expected and received on the other, together with an indicator as to which of the two sets is forwarded, and any reports that were received, but not expected.

Preferably, the step of forwarding comprises forwarding whichever set is smallest in number of the set of reports that were expected, but not received on one hand and the set of reports that were both expected and received on the other.

The reports in the present application may be any electronic message from whose simple presence or absence information may be inferred, and whose arrival time may be to some degree predictable. An example of such a message is a health report issued by an agent simply reporting the active status of that agent.

According to certain embodiments, where numerous agents submit regular reports over a network of nodes, the overall network load entailed thereby is reduced by determining at least one node which reports are expected during a given period, and only forwarding those reports that were anomalous. More particularly, reports received during a period may be compared to a list of expected reports, reports that were not received are reported together with unexpected reports, or in a case where fewer expected reports were received than not, the expected reports are reported together with unexpected reports.

A further advantage of the proposed approach is that it inherently gathers information concerning the location of different network entities. This may prove helpful in handling agents or other entities that move from one node to another, for example in the case of and agent installed on a laptop computer of a travelling user, or a machine that is moved from one server room to another. In such cases traffic such as messages or other data for such an agent from the server must be routed via a different path. So as an effect of the previous upstream synchronization is that when the move is detected the database is updated to allow correct routing.

Figure 5:
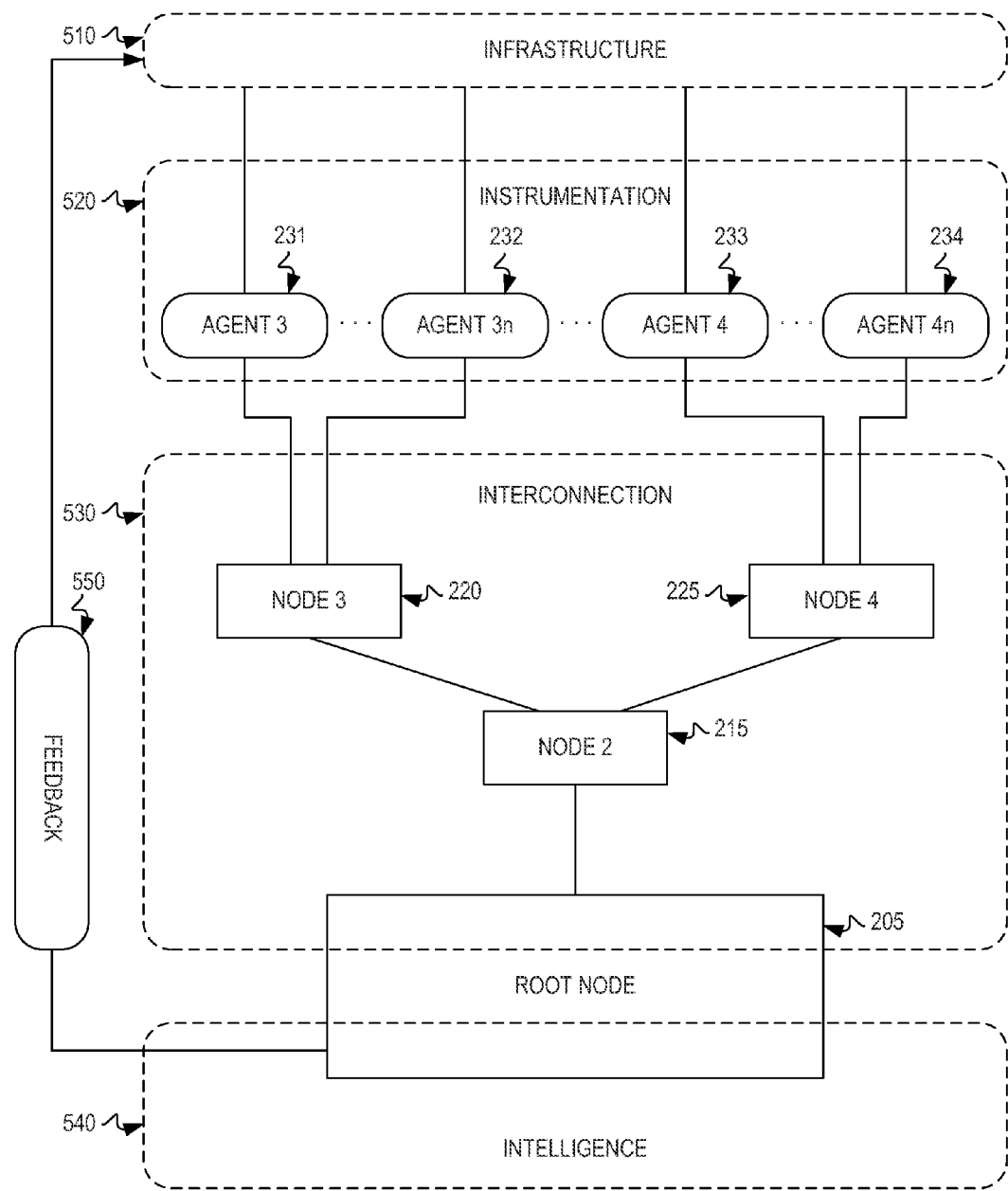
FIG. 5 shows an infrastructure optimisation system in which embodiments may advantageously be implemented.

The present invention may be understood as an improvement to a complete end to end infrastructure optimisation system. FIG. 5 shows an infrastructure optimisation system in which embodiments may advantageously be implemented. The system of FIG. 5 comprises an infrastructure 510, parts of which are monitored by the agent 231, 232, 233, 234 in an instrumentation layer 520. Data from the instrumentation layer is conveyed by interconnected nodes 205, 215, 220, 225 in an interconnection layer 530. The root node 205 furthermore belongs to an intelligence layer 540, whereby data generated by the agents 231, 232, 233, 234 and conveyed by the interconnection layer 530 is processed to as to identify performance issues or error states in the parts of the infrastructure layer 510 monitored but the instrumentation layer. On the basis of this processing in the intelligence layer 540, feedback 550 is generated such at to optimise performance at the infrastructure layer. By minimising network resource overhead consumption from the reports of agents in the interconnection layer as described above, the overall efficiency of the system is improved, in particular with respect to the speed at which complete data can be conveyed from the Instrumentation layer 520 to the intelligence layer 540, and therefore enable a more rapid generation of pertinent feedback, leading to enhanced performance of the infrastructure.

The invention can take the form of an entirely hardware embodiment, an entirely software embodiment or an embodiment containing both hardware and software elements. In particular, hardware embodiments may take the form of a network node adapted to implement the steps described above. Hardware embodiments may furthermore take the form of a network comprising a number of such nodes. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
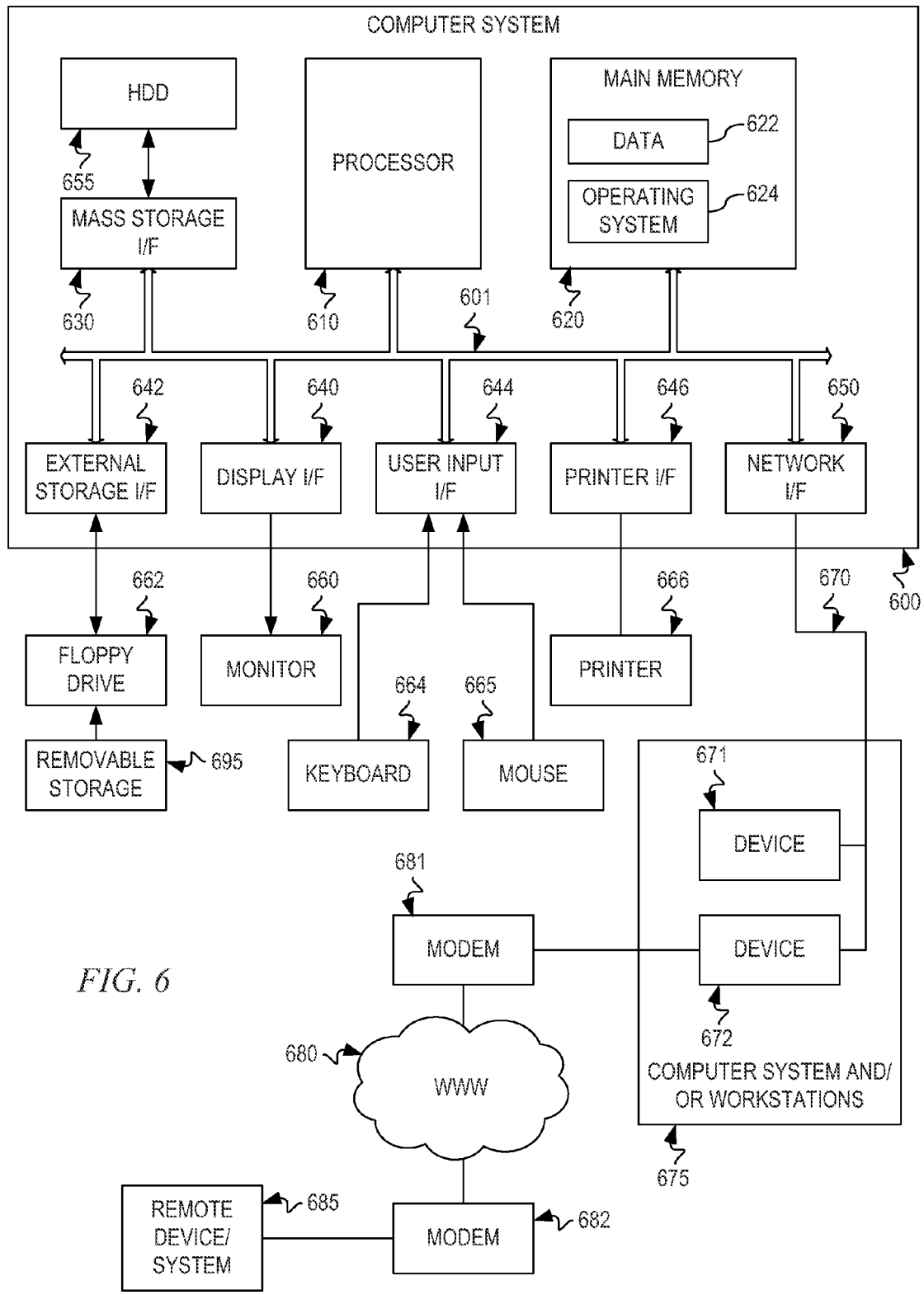
FIG. 6 shows a data processing system suitable for storing and/or executing program code.

FIG. 6 shows a data processing system suitable for storing and/or executing program code Computer system 600 comprises a processor 610, a main memory 620, a mass storage interface 630, a display interface 640, and a network interface 650. These system components are interconnected through the use of a system bus 601. Mass storage interface 630 is used to connect mass storage devices (hard disk drive 655) to computer system 600, One specific type of removable storage interface drive 662 is a floppy disk drive which may store data to and read data from a floppy disk 695, but may other types of computer readable storage medium may be envisaged, such as readable and optionally writable CD ROM drive, which may be connected via external storage interface 642. There is similarly provided a user input interface 644 which received user interactions from interface devices such as a mouse 665 and a keyboard 664. There is still further provided a printer interface 646 which may send and optionally receive signals to and from a printer 666.

Main memory 620 in accordance with die preferred embodiments contains data 622 and operating system 624.

Computer system 600 utilizes well known virtual addressing mechanisms that allow the programs of computer system 600 to behave as if they only have access to a large, single storage entity instead of access to multiple, smaller storage entities such as main memory 620 and HDD 655. Therefore, while data 622 and operating system 624, are shown to reside in main memory 620, those skilled in the art will recognize that these items are not necessarily all completely contained in main memory 620 at the same time. It should also be noted that the term "memory" is used herein to generically refer to the entire virtual memory of computer system 600.

Data 622 represents any data that serves as input to or output from any program in computer system 600. Operating system 624 is a multitasking operating system known in the industry as OS/400; however, those skilled in the art will appreciate that the spirit and scope of the present invention is not limited to any one operating system.

Processor 610 may be constructed from one or more microprocessors and/or integrated circuits. Processor 610 executes program instructions stored in main memory 620. Main memory 620 stores programs and data that processor 610 may access. When computer system 600 starts up, processor 610 initially executes the program instructions that make up operating system 624. Operating system 624 is a sophisticated program that manages the resources of computer system 600. Some of these resources are processor 610, main memory 620, mass storage interface 630, display interface 640, network interface 650, and system bus 601.

Although computer system 600 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 610. However, those skilled in the art will appreciate that the present invention applies equally to computer systems that simply use I/O adapters to perform similar functions.

Display interface 640 is used to directly connect one or more displays 660 to computer system 600. These displays 660, which may be non-intelligent (i.e., dumb) terminals or fully programmable workstations, are used to allow system administrators and users to communicate with computer system 600. Note, however, that while display interface 640 is provided to support communication with one or more displays 660, computer system 600 does not necessarily require a display 660, because all needed interaction with users and other processes may occur via network interface 650.

Network interface 650 is used to connect other computer systems and/or workstations (e.g., 675 in FIG. 6) to computer system 600 across a network 670. In accordance with embodiments of the Invention, such other computer systems and/or workstations may constitute other nodes. The present invention applies equally no matter how computer system 600 may be connected to other computer systems and/or workstations, regardless of whether the network connection 670 is made using present-day analogue and/or digital techniques or via some networking mechanism of the future. In addition, many different network protocols can be used to implement a network. These protocols are specialized computer programs that allow computers to communicate across network 670. TCP/IP (Transmission Control Protocol/Internet Protocol) is an example of a suitable network protocol, for example over an Ethernet network. As shown, the network 670 connects the system 600 to two further devices 671 and 672, which may be other computer systems similar to that described above, or other network capable devices such as printers, routers etc. In the present example, network device 672 is a lcl server, which is connected via a modem 681 to a public network 680 such as the word wide web. By means of this public network 680 a connection to a remote device or system 685 may be established via a modem 682.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 695 of FIG. 6), and transmission type media such as digital and analogue communications links.

The invention claimed is:

1. A method of minimising network resource overhead consumption by reports from one or more agents distributed in an electronic data network of nodes having a hierarchical reporting structure, the method comprising:

compiling, by a node in the electronic network of nodes, a list of all of one or more agents in the electronic network nodes, wherein each agent in the one or more agents has a report period;

defining, by the node, a sequence of report windows, wherein each report window in the sequence of report windows has a specified beginning time and end time;

receiving, by the node, reports from the one or more agents further from a network root node in the electronic network of nodes;

with regard to a current report window and for each of the one or more agents, determining, by the node whether a report was received from each respective agent in a respective preceding window, wherein the respective preceding window is a window whose beginning time is before the beginning time of the current report window minus the report period of the respective agent and whose end time is before the end time of the current report window minus the report period of the respective agent and wherein such a report was received for the respective agent in the respective preceding window considering a further report from the respective agent to be expected in the current report window;

await, by the node, reports from the one or more agents for the duration of the current report window; and after the end of the current report window, forward, by the node, one of either the set of reports that were expected but not received or the set of reports that were both expected and received, an indicator as to which of the two sets is forwarded, and any reports that were received but not expected to another node closer to the network root in response to the another node existing between the node and the network root node, wherein the node is adapted to only report variations in the expected report flow associated with the received reports or to the network root node in response to no other node existing between the node and the network root node, wherein the node is adapted to only report variations in the expected report flow associated with the received reports.

2. The method of claim 1, where only unexpected report are submitted to the another node closer to the network root node.

3. The method of claim 1, wherein the step of forwarding comprises forwarding whichever set is smallest in number of the set of reports that were expected but not received or the set of reports that were both expected and received.

4. The method of claim 1, wherein each window has a same duration.

5. The method of claim 1, wherein the report period of each agent of the one or more agents has a same duration.

6. The method of claim 1, further comprising;

determining the report period of each agent of the one or more agents to be an average interval between a predetermined number of previous reports from that respective agent.

7. The method of claim 1, wherein each agent notifies its report period.

8. The method of claim 1, wherein the report period of each agent of the one or more agents is set from a control node, and wherein the control node notifies each node in the electronic network of nodes of the report period for each agent of the one or more agents from which it is to receive reports.

* * * * *